(12) United States Patent
Chung et al.

(10) Patent No.: US 12,331,771 B2
(45) Date of Patent: Jun. 17, 2025

(54) TOOL-FREE SCREW ASSEMBLY, TOOL-FREE SCREW AND ACCESSORY OF TOOL-FREE SCREW

(71) Applicant: Wiwynn Corporation, New Taipei (TW)

(72) Inventors: Yung-Ti Chung, New Taipei (TW); Jheng-Ying Jiang, New Taipei (TW); Chih-Wei Tseng, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 298 days.

(21) Appl. No.: 17/954,330

(22) Filed: Sep. 28, 2022

(65) Prior Publication Data
US 2023/0407901 A1 Dec. 21, 2023

(30) Foreign Application Priority Data
Jun. 15, 2022 (TW) .................................. 111122159

(51) Int. Cl.
*F16B 21/04* (2006.01)
(52) U.S. Cl.
CPC ..................................... *F16B 21/04* (2013.01)
(58) Field of Classification Search
CPC .......... F16B 21/04; F16B 39/10; F16B 39/28; B25B 27/143
See application file for complete search history.

(56) References Cited

U.S. PATENT DOCUMENTS

| | | | | |
|---|---|---|---|---|
| 2,896,684 A | * | 7/1959 | Zahodiakin | F16B 39/28 411/929 |
| 3,489,041 A | * | 1/1970 | Lewis | B25B 13/48 81/125 |
| 3,760,659 A | * | 9/1973 | Campbell | H05K 13/0007 81/176.15 |
| 2022/0243753 A1 | * | 8/2022 | Wang | F16B 21/04 |
| 2022/0364946 A1 | * | 11/2022 | Sievert | G01N 27/283 |

* cited by examiner

*Primary Examiner* — David M Upchurch
(74) *Attorney, Agent, or Firm* — JCIPRNET (57) ABSTRACT

Disclosed is a tool-free screw assembly includes a base, a stud, and a sleeve coaxially disposed on a center axis. The base has a second latching mechanism. The stud movably disposed through the base has a third latching mechanism. The sleeve movably sheathing over the stud has a first latching mechanism. In a first state, the sleeve and the base are latched by the first and the second latching mechanisms, and the sleeve and the stud are latched by the first and the third latching mechanism. In a second state, the sleeve and the base are separated from each other by unlatching the first and the second latching mechanism, and the sleeve and the stud are latched by the first and the third latching mechanism, such that the sleeve and the stud are synchronously rotatable relative to the base. A tool-free screw and an accessory thereof are also disclosed.

13 Claims, 8 Drawing Sheets

TOOL-FREE SCREW ASSEMBLY, TOOL-FREE SCREW AND ACCESSORY OF TOOL-FREE SCREW

CROSS-REFERENCE TO RELATED APPLICATION

This application claims the priority benefit of Taiwanese application no. 111122159, filed on Jun. 15, 2022. The entirety of the above-mentioned patent application is hereby incorporated by reference herein and made a part of this specification.

BACKGROUND

Technical Field

The disclosure relates to a screw and an assembly and an accessory thereof. Particularly, the disclosure relates to a tool-free screw assembly, a tool-free screw, and an accessory of a tool-free screw.

Description of Related Art

An existing screw is typically required to be structurally fixed with a washer, a screw cap, or even adhesive dispensing to effectively prevent occurrences of loosening.

However, issues may subsequently occur in the above-mentioned manners. Taking the washer as an example, since the washer and the screw are independent components, they are likely to be scattered and lost after disassembly, and are difficult to save for users. Moreover, the washer increases a locking force on the screw by increasing a frictional force, resulting in a certain extent of dependence on properties of a material thereof. Accordingly, the requirements can not be met in the absence of frictional force due to lack of abrasion resistance. In other words, durability or a service life of the washer decreases as the use count increases.

In addition, although adhesive dispensing can directly fix the screw and a target to be locked thereby, it is obvious that repeated assembly and disassembly are not likely. At the same time, adhesive dispensing requires time of waiting for curing, and cannot achieve immediate locking.

Based on the foregoing, how to improve convenience of use and also overcome the technical issues above with a tool-free screw, and maintain a proper locking force of the screw to prevent loosening is a topic to be considered by relevant artisans.

SUMMARY

A tool-free screw assembly according to an embodiment of the disclosure includes a base, a stud, and a sleeve coaxially disposed on a same center axis. The stud is movably disposed through the base. The sleeve movably sheathes over the stud. The sleeve has a first latching mechanism and a fourth latching mechanism, the base has a second latching mechanism, and the stud has a third latching mechanism. The first latching mechanism is configured to latch or unlatch the second latching mechanism, and the third latching mechanism and the fourth latching mechanism are configured to switch between different latching states. In a first state, the sleeve and the base are latched by the first latching mechanism and the second latching mechanism, and the sleeve and the stud are latched by the fourth latching mechanism and the third latching mechanism to form one of the latching states. In a second state, the sleeve and the base are separated from each other by unlatching the first latching mechanism and the second latching mechanism, and the sleeve and the stud are latched by the fourth latching mechanism and the third latching mechanism to form another one of the latching states, such that the sleeve and the stud are synchronously rotatable relative to the base along the center axis.

A tool-free screw according to an embodiment of the disclosure is configured to be locked to an object. The object has a second latching mechanism. The tool-free screw includes a sleeve and a stud coaxially disposed on a same center axis. The sleeve movably sheathes over the stud. The sleeve has a first latching mechanism and a fourth latching mechanism, and the stud has a third latching mechanism. The first latching mechanism is configured to latch or unlatch the second latching mechanism, and the third latching mechanism and the fourth latching mechanism are configured to switch between different latching states. In a first state, the stud lock is locked to the object, the sleeve and the object are latched by the first latching mechanism and the second latching mechanism, and the sleeve and the stud are latched by the fourth latching mechanism and the third latching mechanism to form one of the latching states. In a second state, the sleeve and the object are separated from each other by unlatching the first latching mechanism and the second latching mechanism, and the sleeve and the stud are latched by the fourth latching mechanism and the third latching mechanism to form another one of the latching states, such that the sleeve and the stud are synchronously rotatable relative to the object along the center axis.

An accessory of a tool-free screw according to an embodiment of the disclosure is adapted for a stud. The stud has a third latching mechanism. The accessory includes a sleeve and a base. The sleeve movably sheathes over the stud. The stud is movably disposed through the base. The sleeve, the base, and the stud are coaxially disposed on a same center axis. The sleeve has a first latching mechanism and a fourth latching mechanism, and the base has a second latching mechanism. The first latching mechanism is configured to latch or unlatch the second latching mechanism, and the third latching mechanism and the fourth latching mechanism are configured to switch between different latching states. In a first state, the sleeve and the base are latched by the first latching mechanism and the second latching mechanism, and the sleeve and the stud are latched by the fourth latching mechanism and the third latching mechanism to form one of the latching states. In a second state, the sleeve and the base are separated from each other by unlatching the first latching mechanism and the second latching mechanism, and the sleeve and the stud are latched by the fourth latching mechanism and the third latching mechanism to form another one of the latching states, such that the sleeve and the stud are synchronously rotatable relative to the base along the center axis.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
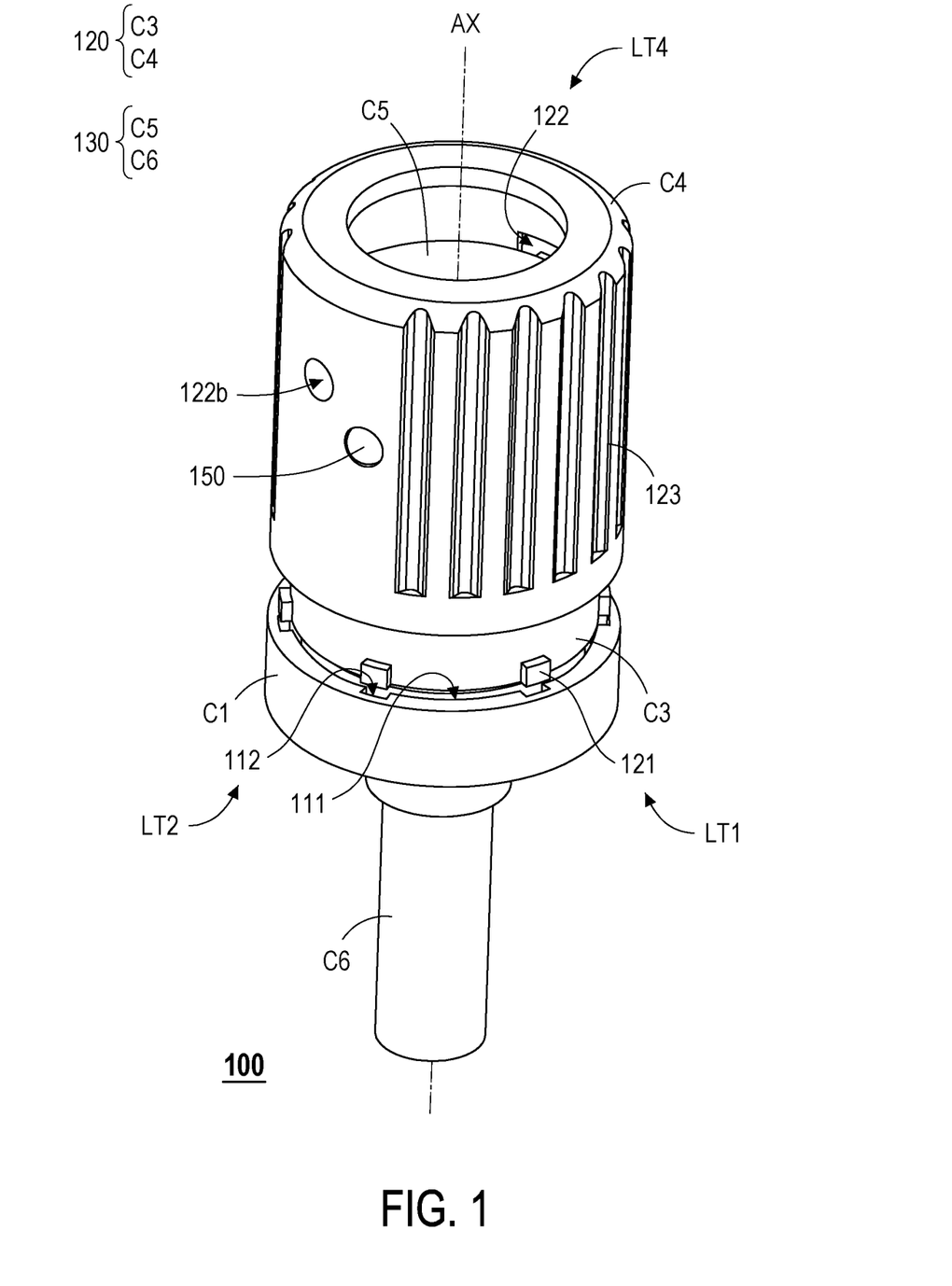
FIG. 1 is a schematic view of a tool-free screw assembly according to an embodiment of the disclosure.
Figure 2:
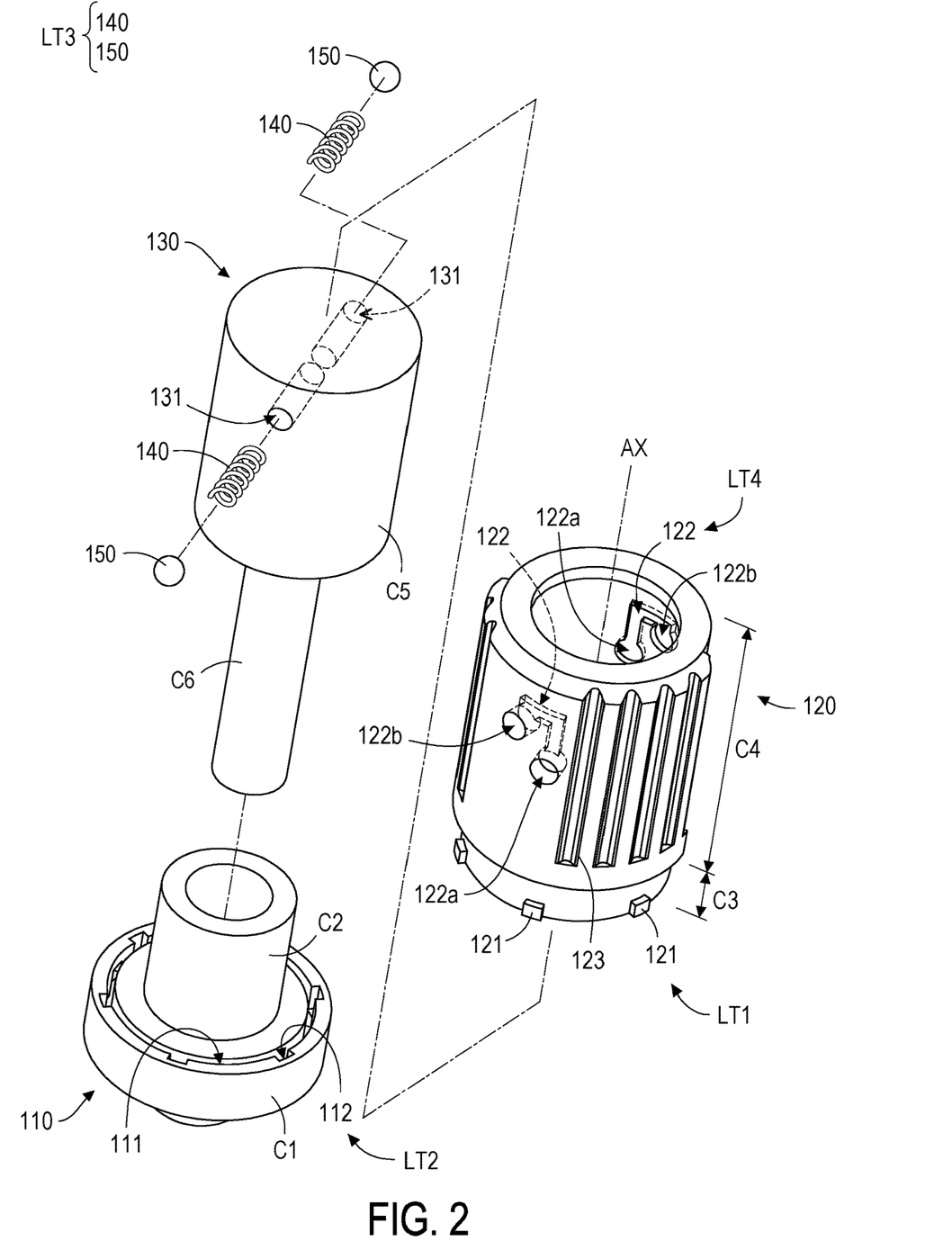
FIG. 2 is an exploded view of the tool-free screw assembly of FIG. 1.

FIG. 1 is a schematic view of a tool-free screw assembly according to an embodiment of the disclosure. FIG. 2 is an exploded view of the tool-free screw assembly of FIG. 1. With reference to FIG. 1 and FIG. 2 together, in this embodiment, a tool-free screw assembly 100 includes a base 110, a stud 130, and a sleeve 120 coaxially disposed on a same center axis AX. The stud 130 is movably disposed through the base 110, and the sleeve 120 movably sheathes over the stud 130. The sleeve 120 has a first latching mechanism LT1 and a fourth latching mechanism LT4, the base 110 has a second latching mechanism LT2, and the stud 130 has a third latching mechanism LT3. The first latching mechanism LT1 is configured to latch or unlatch the second latching mechanism LT2, and the third latching mechanism LT3 and the fourth latching mechanism LT4 are configured to switch between different latching states. In a first state, the sleeve 120 and the base 110 are latched by the first latching mechanism LT1 and the second latching mechanism LT2, and the sleeve 120 and the stud 130 are latched by the fourth latching mechanism LT4 and the third latching mechanism LT3 to form one of the latching states. In a second state, the sleeve 120 and the base 110 are separated from each other by unlatching the first latching mechanism LT1 and the second latching mechanism LT2, and the sleeve 120 and the stud 130 are latched by the fourth latching mechanism LT4 and the third latching mechanism LT3 to form another one of latching states, such that the sleeve 120 and the stud 130 are synchronously rotatable relative to the base 110 along the center axis AX. The various latching mechanisms mentioned above will be described later.

Further, as shown in FIG. 2, in this embodiment, a body of the sleeve 120 is divided into a driving part C4 and a latching part C3 along the center axis AX. The first latching mechanism LT1 includes at least one bump 121 disposed on an outer wall surface of the latching portion C3 (this embodiment is exemplified with a plurality of bumps 121, but not limited thereto). The fourth latching mechanism LT4 includes at least one switching track 122 disposed at the driving part C4 (this embodiment is exemplified with two switching tracks 122, but not limited thereto). The base 110 is a columnar structure disposed along the center axis AX, and is divided into an outer ring part C1 with a larger column diameter and a stud hole part C2 with a smaller column diameter along the center axis AX. The base 110 has an annular groove 111 disposed at the outer ring part C1. The second latching mechanism LT2 includes a latching track 112 disposed on an inner wall of the annular groove 111.

Correspondingly, the stud 130 is a columnar structure along the center axis AX, and is divided into a driving part C5 and a threaded part C6 along the center axis AX. The threaded part C6 is movably disposed through the stud hole part C2 and the outer ring part C1 of the base 110, and the sleeve 120 movably sheathes over the driving part C5 of the stud 130. In this embodiment, illustration of the thread on the surface of the threaded part C6 is omitted to facilitate the identification of other components. Also, the sleeve 120, the stud 130, and the base 110 coaxially disposed on the same center axis AX each present a columnar structure, and are coaxial with each other on the same center axis AX.

Figure 3:
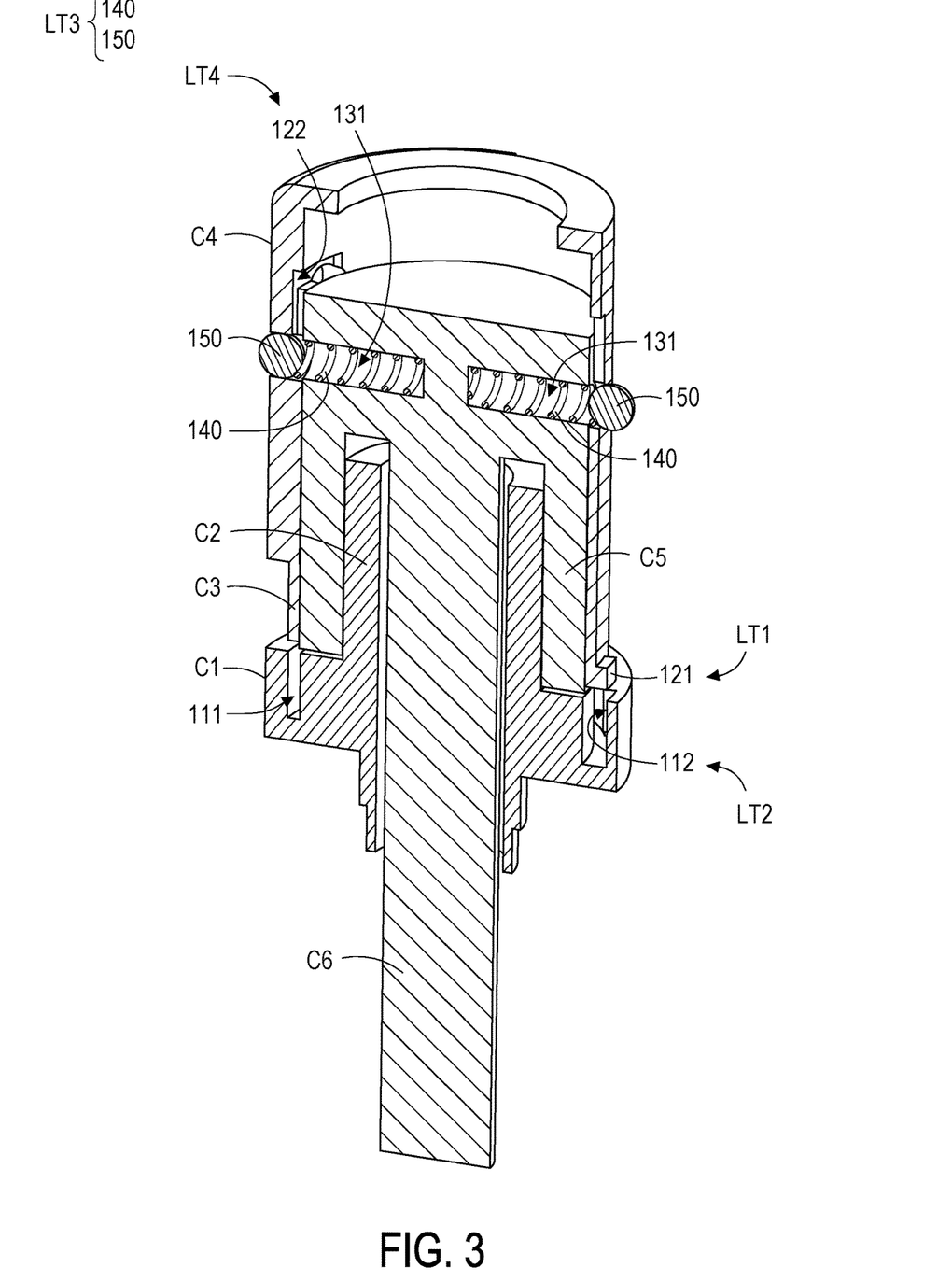
FIG. 3 is a perspective cross-sectional view of the tool-free screw assembly of FIG. 1.

FIG. 3 is a perspective cross-sectional view of the tool-free screw assembly of FIG. 1. FIG. 3 shows not only a section of the tool-free screw assembly 100 shown in FIG. 1, but also a partial section of the sleeve 120 to facilitate the identification of the third latching mechanism LT3. With reference to FIG. 2 and FIG. 3 together, in the tool-free screw assembly 100 of this embodiment, the third latching mechanism LT3 includes an elastic element 140 and a ball pin 150 disposed at the stud 130. The ball pin 150 movably abuts the switching track 122. The elastic element 140 abuts between the stud 130 and the ball pin 150 and constantly pushes the ball pin 150 toward the body of the sleeve 120. Further, the stud 130 has an opening hole 131 disposed at the driving part C5. The elastic element 140 is disposed in the opening hole 131 and abuts the ball pin 150 and the inner end of the opening hole 131. Moreover, since the sleeve 120 sheathes over the stud 130 on the outside, the ball pin 150 pushed by the elastic force of the elastic element 140 can movably abut the switching track 122 disposed at the driving part C4.

Figure 4:
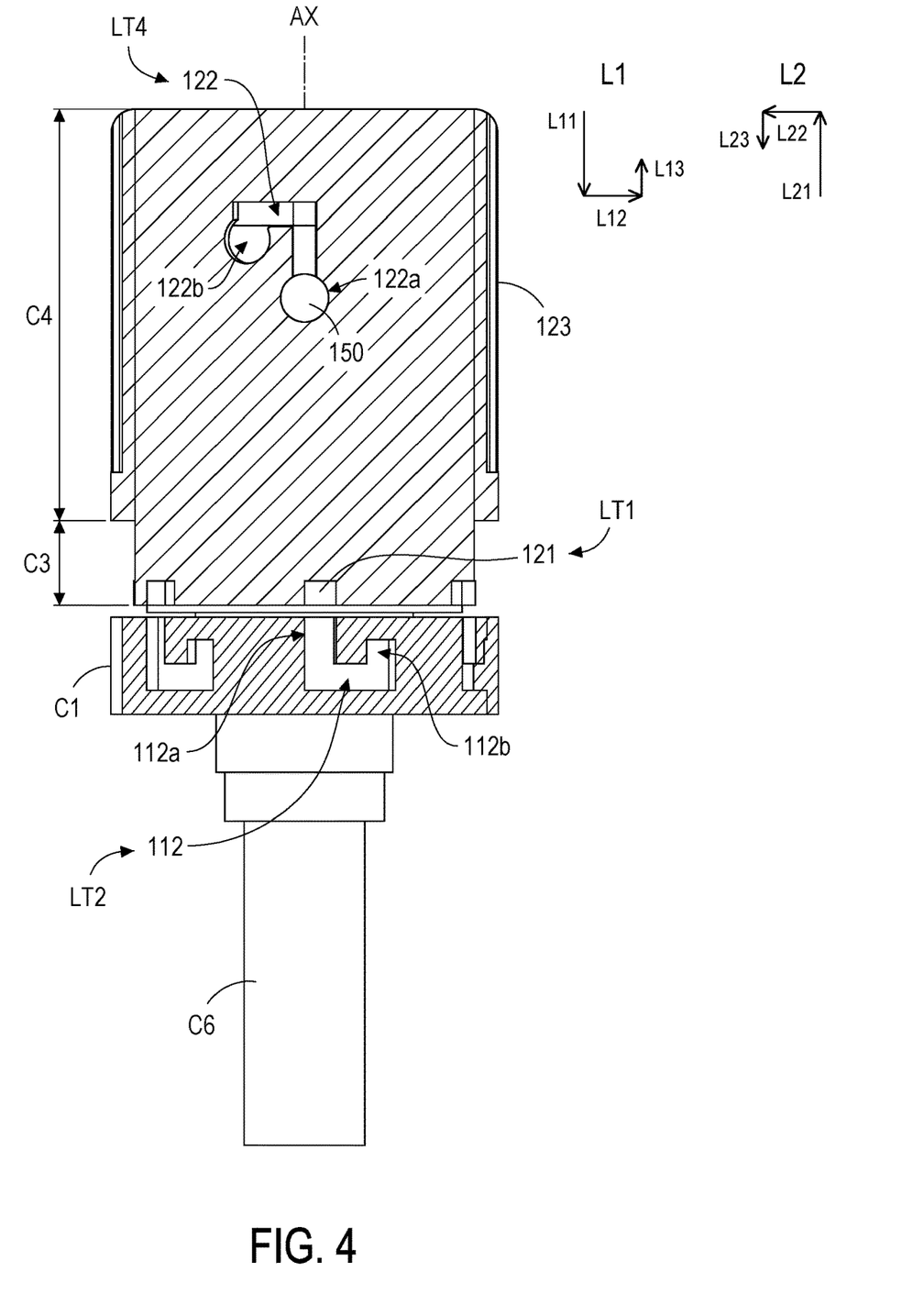
FIG. 4 to FIG. 6 are partial cross-sectional views showing a latching process of a tool-free screw assembly.
Figure 5:
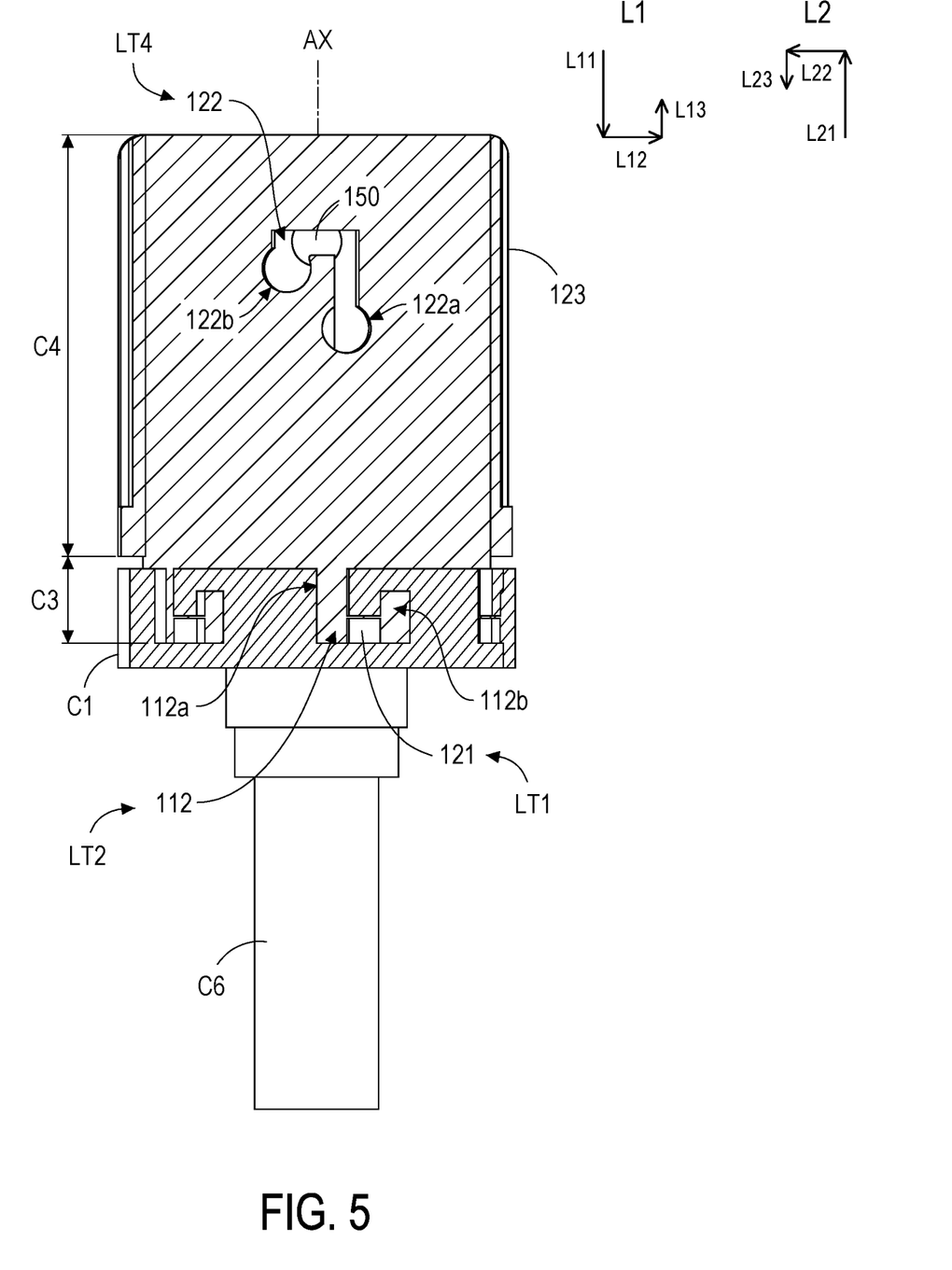
Figure 6:
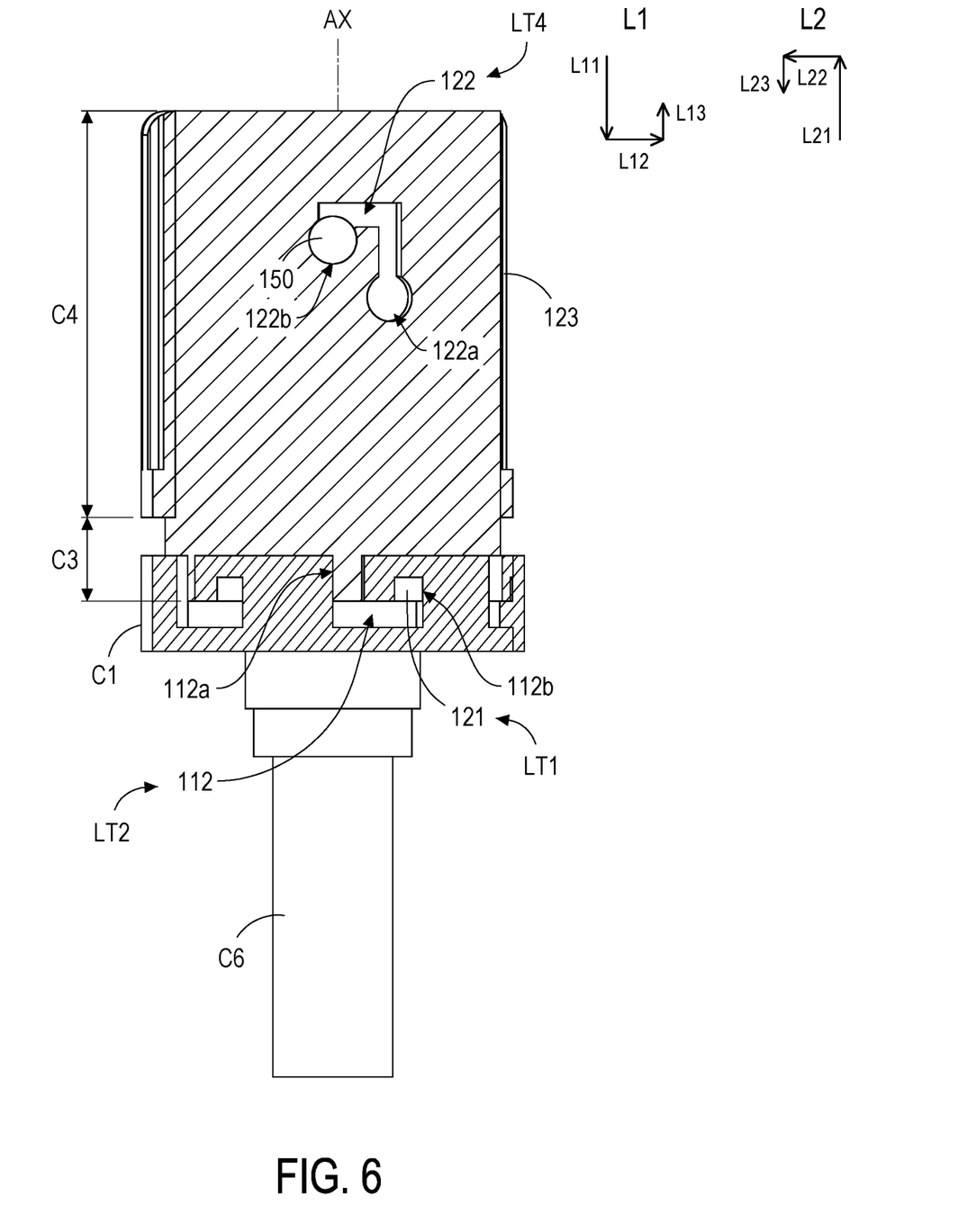

FIG. 4 to FIG. 6 are partial cross-sectional views showing a latching process of a tool-free screw assembly, facilitating the identification of the switching process of the tool-free screw assembly 100. First, with reference to FIG. 2 and FIG. 4, FIG. 4 shows the second state of the tool-free screw assembly 100, in which the bump 121 is located outside the latching track 112, so the sleeve 120 and the base 110 separated from each other. In the meantime, the switching track 122 have a first positioning slot 122a and a second positioning slot 122b on the opposite ends, and the ball pin 150 is located in the first positioning slot 122a at this time. Therefore, the sleeve 120 and the stud 130 are in the one of the latching states at this time, and the sleeve 120 and the base 110 are unlatched (separated) from each other. At this time, the user may apply a force to hold the driving part C4 of the sleeve 120 and drive the sleeve 120 and the stud 130 to synchronously rotate relative to the base 110 along the center axis AX. In other words, the user may drive the stud 130 to be locked to an object (not shown) or unlocked from the object through the sleeve 120 at this time. In this embodiment, a groove structure 123 is disposed on an outer wall of the sleeve 120 to facilitate an increase in the frictional force during holding of the user and facilitate the operation.

Next, with reference to FIG. 4 and FIG. 5 together, after the stud 130 is locked to the object by the user, the base 110 is sandwiched between the stud 130 and the object. At this time, the bump 121 may be aligned with an entrance 112a by adjusting the relative positions of the sleeve 120 and the base 110. By alternative design, the bump 121 may be aligned with the entrance 112a after the sleeve 120 travels a specific locking stroke during the locking process above. The entrance 112a is substantially located at a groove opening of the annular groove 111. By whichever of the above, the bump 121 of the sleeve 120 can smoothly correspond to the entrance 112a of the latching track 112 of the base 110, which facilitates subsequently moving the bump 121 into the latching track 112. Then, as shown in FIG. 5, the user drives the sleeve 120 to move along the center axis AX to move the latching part C3 into the annular groove 111, that is, move the bump 121 into the latching track 112. Next, the user may drive the sleeve 120 to move or rotate relative to the base 110 to move the bump 121 along the latching track 112 until the bump 121 abuts a terminal end 112b of the latching track 112, as shown in FIG. 6. In another embodiment not shown, a chamfered structure may be added at the entrance 112a to facilitate guiding the bump 121 into the latching track 112.

In addition, the time when the bump 121 moves into the latching track 112 also means that the ball pin 150 moves from the first positioning slot 122a to the second positioning slot 122b of the switching track 122. Further, as in the second state, the ball pin 150 actually falls into the first positioning slot 122a to latch the sleeve 120 and the stud 130. Therefore, during the actual operation, the user is required to first press the ball pin 150 to detach the ball pin 150 from the first positioning slot 122a along the radial direction (taking the center axis AX as the reference center). That is, the ball pin 150 is pressed in the direction toward the center axis AX to smoothly unlatch the sleeve 120 and the stud 130 and the sleeve 120 is driven to move or rotate relative to the stud 130 and relative to the base 110 along the center axis AX, and the state is switched from FIG. 4 to FIG. 5, and then from FIG. 5 to FIG. 6, which shows the first state. At this time, the bump 121 abuts the terminal end 112b of the latching track 112, the ball pin 150 falls into the second positioning slot 122b, and the sleeve 120 is latched with each of the stud 130 and the base 110 to be held and fixed together In this embodiment, observed from a side view perspective (e.g., in FIG. 4 to FIG. 6), the latching track 112 is similar to an L-shaped track with an opening facing the sleeve 120, and is further divided into a first section L11, a second section L12, and a third section L13 sequentially connected to each other. The first section L11 has the entrance 112a of the latching track 112, the second section L12 is connected between the first section L11 and the third section L13, and the third section L13 has the terminal end 112b of the latching track 112. The bump 121 abuts the terminal end 112b and is located at the third section L13 in the first state, and the bump 121 moves away from the latching track 112 in the second state.

Furthermore, the first section L11 and the third section L13 are parallel to the center axis AX, and the second section L12 is an arc-shaped path surrounding the center axis AX (e.g., from top view). Moreover, the third section L13 having the terminal end 112b is in a form of a dead end. In other words, as shown in FIG. 6, the only path for the bump 121 abutting the terminal end 112b to leave the terminal end 112b is moving in the opposite direction along the third section L13. It is also shown that the third section L13 is actually located in the structure of the outer ring part C1 and is not in communication with the environment outside the structure of the outer ring part C1 (except for the latching track 112). Accordingly, the sleeve 120 and the base 110 can only be separated in the opposite direction along the latching track 112, forming the first state of latching the sleeve 120 and the base 110 as shown in FIG. 6. In other words, the latching track 112 is the only way for the sleeve 120 and the base 110 to be latched with or unlatched from each other.

Comparatively, the switching track 122 works with the latching track 112, and is further divided into a fourth section L21, a fifth section L22, and a sixth section L23. The fifth section L22 is connected between the fourth section L21 and the sixth section L23. The first positioning slot 122a is located at a place of the fourth section L21 opposite to the fifth section L22, and the second positioning slot 122b is located at a place of the sixth section L23 opposite to the fifth section L22. The ball pin 150 is rollably coupled to the fourth section L21, the fifth section L22, and the sixth section L23. Moreover, the first state (i.e., the one of the latching states) is formed when the ball pin 150 falls into the first positioning slot 122a, or the second state (i.e., the another one of the latching states) is formed when the ball pin 150 falls into the second positioning slot 122b. The fourth section L21 and the sixth section L23 are parallel to the center axis AX, and the fifth section L22 is an arc-shaped path surrounding the center axis AX.

The rectangular spiral track in whichever of the latching track 112 and the switching track 122 further fastens the locked stud 130 effectively. In addition, the sleeve 120 is not likely to be detached from the base 110 due to vibration or other factors with the hook structure generated by the rectangular spiral track.

Based on the foregoing, the bump 121 moves from the entrance 112a to the terminal end 112b on a path L1 in the latching track 112. In the meantime, the ball pin 150 moves from the first positioning slot 122a to the second positioning slot 122b on a path L2 in the switching track 122. In other words, the first section L11, the second section L12, and the third section L13 of the latching track 112 are in opposite directions to the fourth section L21, the fifth section L22, and the sixth section L23 of the switching track 122 (the path L1 is opposite to the path L2) to suit the requirement that the sleeve 120 can move relative to the base 110 and the stud 130 at the same time along the center axis AX.

In addition, in this embodiment, comparing FIG. 1 together with FIG. 3 shows that the diameters of the first positioning slot 122a and the second positioning slot 122b of the sleeve 120 on the outer surface of the body of the sleeve 120 are smaller than the diameter of the ball pin 150, preventing the ball pin 150 from falling.

In another embodiment not shown, different from the arrangement of the ball pin 150, the elastic element 140, and the switching track 122 mentioned above, the tool-free screw assembly 100 may also achieve positioning through additionally disposed pins. In other words, when the first positioning slot 122a or the second positioning slot 122b corresponds to the opening hole 131 in the stud 130, the user may achieve the same positioning and fixing as mentioned above by inserting a pin or a relevant hand tool into the first positioning slot 122a (or the second positioning slot 122b) and the opening hole 131, so that relative (rotational) movement between the sleeve 120 and the stud 130 also cannot be generated.

Figure 7:
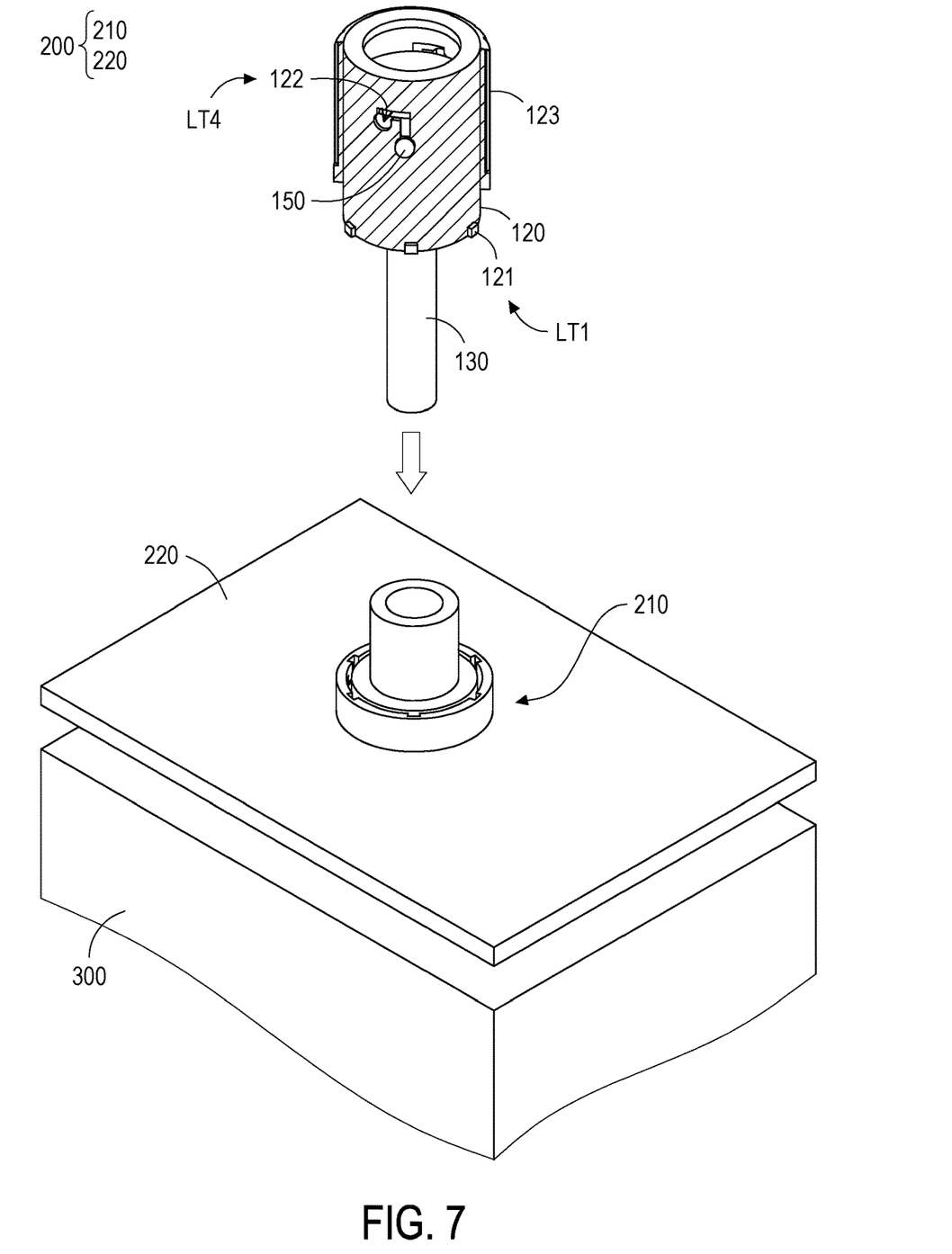
FIG. 7 is a schematic view of using a tool-free screw according to another embodiment of the disclosure.

FIG. 7 is a schematic view of using a tool-free screw according to another embodiment of the disclosure. With reference to FIG. 7, in this embodiment, an object 200 and an object 300 are locked with a tool-free screw. Different from the embodiments above, the object 200 includes a base 210 and a member 220. In other words, the base 210 is substantially a local structure of the object 200, which may be achieved by welding, riveting, or the like. The sleeve 120 and the stud 130 disclosed in the embodiments above constitute the tool-free screw of this embodiment. Here, the partial sections of the sleeve 120 and the stud 130 are also shown to facilitate the identification of the switching track 122 and the ball pin 150 on the sleeve 120. Accordingly, when the stud 130 locks the objects 200 and 300, the base 210 is sandwiched between the stud 130 and the objects 200 and 300 to increase the locking force, and the locking force is also increased by the latching of the sleeve 120 and the base 210, thus reducing the likelihood of the stud 130 loosening.

Figure 8:
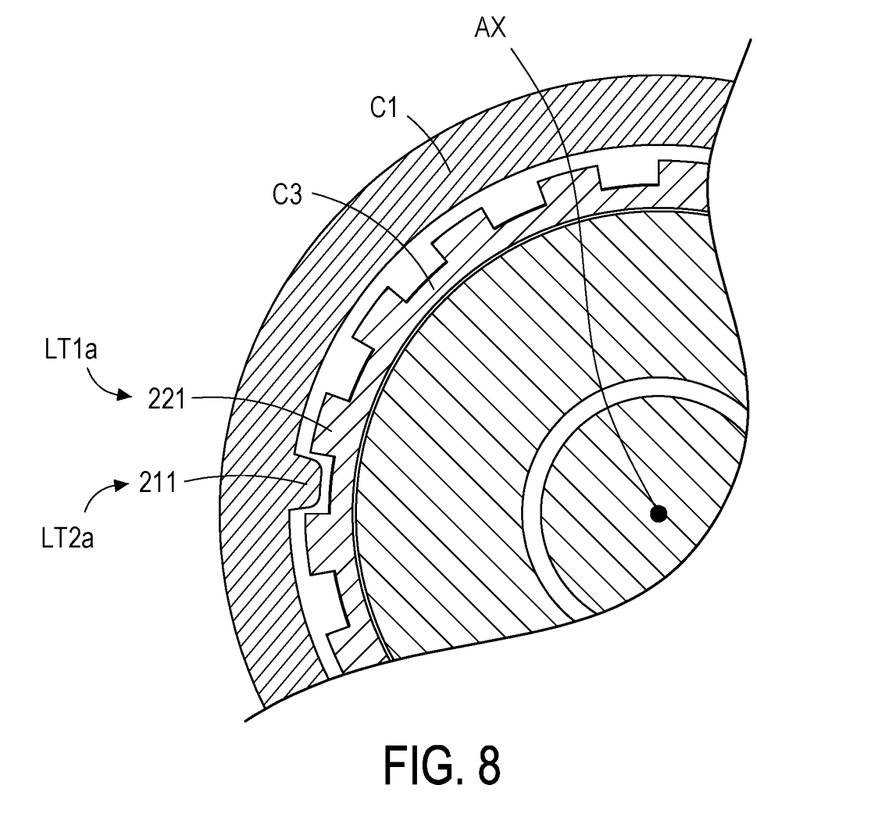
FIG. 8 is a partial cross-sectional view of a tool-free screw assembly according to another embodiment of the disclosure.

FIG. 8 is a partial cross-sectional view of a tool-free screw assembly according to another embodiment of the disclosure. With reference to FIG. 8, in this embodiment, the first latching mechanism Lila includes a plurality of engaging serrations 221 disposed on the outer wall of the body of the sleeve, and the second latching mechanism LT2a includes at least one bump 211 disposed on the inner wall of the annular groove of the base. The bump 211 moves in between two adjacent engaging serrations 221 and is engaged with the engaging serrations 221 in the first state, and the bump 211 moves away from the engaging serrations 221 in the second state. In other words, due to the engagement relationships between the engaging serrations 221 and the bump 211, the sleeve and the stud are accordingly locked in the first state. Comparatively, if the bump 211 moves away from engaging serrations 221, the sleeve and the base are unlatched and separated. In other words, the latching track and the switching track of this embodiment are substantially parallel to the center axis AX.

As shown from the embodiments above, although the tool-free screw assembly 100 is constituted by the sleeve 120, the stud 130, and the base 110, depending on requirements, the base 110 may be changed to be disposed on the object to be locked, so that the tool-free screw composed of the sleeve 120 and the stud 130 can also lock the objects 200 and 300 accordingly. Moreover, since the sleeve 120 and the base 110 can be movably used with the stud 130, the stud 130 may be regarded as an accessory of a tool-free screw. In other words, any form of the stud 130 having a third latching mechanism can be adapted for the sleeve 120 and the base 110 to achieve locking.

In summary of the foregoing, in the embodiments of the disclosure, the sleeve, the base, and the stud of the tool-free screw assembly are coaxially disposed on the same center axis and are movably used with each other, so that the sleeve and the base generates the first state and the second state through the first latching mechanism and the second latching mechanism, and the sleeve and the stud can also generate different latching states through the fourth latching mechanism and the third latching mechanism. Accordingly, with the combination of these states, the sleeve can smoothly drive the stud to lock the object. In addition, the sleeve can be further latched to the stud and the base at the same time after locking is completed. In other words, in addition to locking, the stud may also take the base as a washer to increase its locking force. In the meantime, the latching relationships between the sleeve, the stud, and the base also means that these three components can stabilize the locking force of the stud to the object by increasing the combination strength, preventing the stud from loosening from the object. Furthermore, the three components can also be unlatched and disassembled, so that the components can be reused, which facilitates an increase in the service life and a reduction in the manufacturing cost.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A tool-free screw assembly comprising a base, a stud, and a sleeve coaxially disposed on a same center axis, wherein the stud is movably disposed through the base, the sleeve movably sheathes over the stud, the sleeve has a first latching mechanism and a fourth latching mechanism, the base has a second latching mechanism, and the stud has a third latching mechanism, wherein the first latching mechanism is configured to latch or unlatch the second latching mechanism, and the third latching mechanism and the fourth latching mechanism are configured to switch between different latching states, wherein
   in a first state, the sleeve and the base are latched by the first latching mechanism and the second latching mechanism, and the sleeve and the stud are latched by the fourth latching mechanism and the third latching mechanism to form one of the latching states, and
   in a second state, the sleeve and the base are separated from each other by unlatching the first latching mechanism and the second latching mechanism, and the sleeve and the stud are latched by the fourth latching mechanism and the third latching mechanism to form another one of the latching states, such that the sleeve and the stud are synchronously rotatable relative to the base along the center axis.

2. The tool-free screw assembly according to claim 1, wherein the first latching mechanism comprises at least one bump disposed on an outer wall of a body of the sleeve, and the second latching mechanism comprises at least one latching track disposed on an inner wall of an annular groove of the base, wherein the bump is inside the latching track and abuts a terminal end of the latching track in the first state, and the bump is outside the latching track in the second state.

3. The tool-free screw assembly according to claim 2, wherein the latching track comprises a first section, a second section, and a third section sequentially connected to each other, the first section has an entrance of the latching track, the second section is connected between the first section and the third section, and the third section has the terminal end of the latching track, wherein the bump abuts the terminal end in the first state.

4. The tool-free screw assembly according to claim 3, wherein the third section having the terminal end is in a form of a dead end.

5. The tool-free screw assembly according to claim 3, wherein the first section and the third section are parallel to the center axis, and the second section is an arc-shaped path surrounding the center axis.

6. The tool-free screw assembly according to claim 2, wherein the entrance of the latching track is located at a groove opening of the annular groove.

7. The tool-free screw assembly according to claim 1, wherein the fourth latching mechanism comprises a switching track disposed on a body of the sleeve, the third latching mechanism comprises an elastic element and a ball pin disposed at the stud, the ball pin movably abuts the switching track, and the elastic element abuts between the stud and the ball pin and constantly pushes the ball pin toward the body, wherein the elastic element pushes the ball pin to be positioned at one end of the switching track to form the one of the latching states in the first state, and the elastic element pushes the ball pin to be positioned at the other end of the switching track to form the another one of the latching states in the second state.

8. The tool-free screw assembly according to claim 7, wherein the switching track comprises a first positioning slot, a second positioning slot, a fourth section, a fifth section, and a sixth section, the fifth section is connected between the fourth section and the sixth section, the first positioning slot is located at a place of the fourth section opposite to the fifth section, and the second positioning slot is located at a place of the sixth section opposite to the fifth section, wherein the ball pin is rollably coupled to the fourth section, the fifth section, and the sixth section, and forms the one of the latching states when it falls into the first positioning slot, or forms the another one of the latching states when it falls into the second positioning slot.

9. The tool-free screw assembly according to claim 8, wherein the fourth section and the sixth section are parallel to the center axis, and the fifth section is an arc-shaped path surrounding the center axis.

10. The tool-free screw assembly according to claim 1, wherein the first latching mechanism comprises a plurality of engaging serrations disposed on an outer wall of a body of the sleeve, and the second latching mechanism comprises at least one bump disposed on an inner wall of an annular groove of the base, wherein the bump is between adjacent two of the engaging serrations and is engaged with the engaging serrations in the first state, and the bump is outside the engaging serrations in the second state.

11. The tool-free screw assembly according to claim 1, wherein the fourth latching mechanism comprises a first positioning slot and a second positioning slot disposed on a body of the sleeve, and the third latching mechanism comprises a pin and an opening hole disposed at the stud, wherein the opening hole and the second positioning slot correspond to each other for the pin to be inserted in the first state, and the opening hole and the first positioning slot correspond to each other for the pin to be inserted in the second state.

12. The tool-free screw assembly according to claim 1, wherein the first latching mechanism comprises a bump disposed on the sleeve, the fourth latching mechanism comprises a switching track disposed on the sleeve, the second latching mechanism comprises a latching track disposed on the base, and the third latching mechanism comprises a ball pin and an elastic element, wherein the elastic element abuts between the stud and the ball pin to constantly push the ball pin against the sleeve such that the ball pin is adapted to move along the switching track, and a moving path of the bump along the latching track is opposite to a moving path of the ball pin along the switching track.

13. The tool-free screw assembly according to claim 1, wherein the stud is adapted to be locked to an object, and the base is sandwiched between the stud and the object in the first state.

* * * * *